United States Patent
Hohn et al.

(10) Patent No.: US 11,608,846 B1
(45) Date of Patent: *Mar. 21, 2023

(54) PROCESS FOR MANUFACTURING A BI-MATERIAL SHAFT

(71) Applicant: Callaway Golf Company, Carlsbad, CA (US)

(72) Inventors: Grace Hohn, Carlsbad, CA (US); Norm Smith, Oceanside, CA (US); Augustin W. Rollinson, Solana Beach, CA (US)

(73) Assignee: Topgolf Callaway Brands Corp, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,098

(22) Filed: Feb. 2, 2022

Related U.S. Application Data

(63) Continuation of application No. 16/672,184, filed on Nov. 1, 2019, now Pat. No. 11,248,641, which is a continuation-in-part of application No. 16/368,346, filed on Mar. 28, 2019, now Pat. No. 10,486,036.

(60) Provisional application No. 62/755,668, filed on Nov. 5, 2018, provisional application No. 62/654,052, filed on Apr. 6, 2018.

(51) Int. Cl.
*A63B 53/10* (2015.01)
*A63B 53/12* (2015.01)
*F16B 11/00* (2006.01)
*B29C 35/04* (2006.01)
*C09J 11/04* (2006.01)

(52) U.S. Cl.
CPC ............ *F16B 11/008* (2013.01); *A63B 53/10* (2013.01); *B29C 35/045* (2013.01); *C09J 11/04* (2013.01)

(58) Field of Classification Search
CPC .............................. A63B 53/10; A63B 53/12
USPC ......................................... 473/318, 320, 321
See application file for complete search history.

(56) References Cited

U.S. PATENT DOCUMENTS

| | | | | |
|---|---|---|---|---|
| 4,157,181 A | * | 6/1979 | Cecka | A63C 11/22 473/319 |
| 4,169,595 A | * | 10/1979 | Kaugars | A63B 53/12 473/323 |
| 4,324,404 A | * | 4/1982 | Dian | A63B 53/007 473/250 |
| 4,426,083 A | * | 1/1984 | Dishner, Jr. | A63B 53/007 473/294 |

(Continued)

FOREIGN PATENT DOCUMENTS

| | | | |
|---|---|---|---|
| JP | 06000234 A | * | 1/1994 |
| JP | 2000185119 A | * | 7/2000 |

(Continued)

*Primary Examiner* — Alvin A Hunter
(74) *Attorney, Agent, or Firm* — Michael A. Catania; Rebecca Hanovice; Sonia Lari

(57) ABSTRACT

A process for manufacturing a putter with a bi-material shaft is disclosed herein. The putter comprises a putter head, the bi-material shaft, a mass member and a grip. The bi-material shaft comprises a body with a tip end and a butt end. The body comprises a metal section extending from the tip end to a connection point, and a composite section extending from the butt end to the connection point. The mass member is positioned within an opening at the butt end of the shaft. Mass from the shaft is transferred to the club head and the mass member in the butt end of the shaft.

5 Claims, 14 Drawing Sheets

(56) References Cited

U.S. PATENT DOCUMENTS

| | | | | |
|---|---|---|---|---|
| 4,508,350 A * | 4/1985 | Duclos | ............... | A63B 53/0487 |
| | | | | 473/254 |
| 4,578,424 A * | 3/1986 | Goel | ...................... | C08G 18/58 |
| | | | | 525/111 |
| 4,693,478 A * | 9/1987 | Long | .................. | A63B 53/0487 |
| | | | | 473/251 |
| 4,712,798 A * | 12/1987 | Preato | .................. | A63B 53/065 |
| | | | | 473/250 |
| 4,728,737 A * | 3/1988 | Goel | ...................... | C08G 18/58 |
| | | | | 544/386 |
| 4,836,545 A * | 6/1989 | Pompa | .................. | A63B 53/10 |
| | | | | 273/DIG. 7 |
| 5,022,652 A * | 6/1991 | Fenton | .................. | A63B 53/12 |
| | | | | 473/323 |
| 5,121,925 A * | 6/1992 | Blundo | .................. | A63B 15/00 |
| | | | | 482/109 |
| 5,165,688 A * | 11/1992 | Schmidt | ................ | A63B 60/00 |
| | | | | 29/525 |
| 5,467,984 A * | 11/1995 | Veux | ....................... | A63B 53/00 |
| | | | | 473/287 |
| 5,632,691 A * | 5/1997 | Hannon | ................. | A63B 53/14 |
| | | | | 473/297 |
| 5,655,975 A * | 8/1997 | Nashif | ................... | A63B 53/00 |
| | | | | 473/316 |
| 5,783,298 A * | 7/1998 | Herring, Jr. | ............ | F16B 11/006 |
| | | | | 428/323 |
| 6,139,444 A * | 10/2000 | Renard | ................... | A63B 53/12 |
| | | | | 273/DIG. 7 |
| 6,491,778 B1 * | 12/2002 | Fenton, Jr. | .............. | B29C 70/34 |
| | | | | 473/319 |
| 6,797,208 B2 * | 9/2004 | Schikner | ................. | A63B 53/10 |
| | | | | 156/173 |
| 6,805,642 B2 * | 10/2004 | Meyer | .................... | A63B 60/54 |
| | | | | 473/320 |
| 7,955,187 B2 * | 6/2011 | Bone | ...................... | A63B 60/42 |
| | | | | 473/316 |
| 8,328,657 B1 * | 12/2012 | Demkowski | ......... | A63B 53/007 |
| | | | | 473/239 |
| 11,248,641 B1 * | 2/2022 | Hohn | ...................... | C09J 11/04 |
| 2001/0001772 A1 * | 5/2001 | Fendel | ................... | A63B 60/54 |
| | | | | 473/316 |
| 2003/0119598 A1 * | 6/2003 | Galloway | .............. | A63B 60/54 |
| | | | | 473/319 |
| 2004/0092329 A1 * | 5/2004 | Meyer | ................... | A63B 60/54 |
| | | | | 473/319 |
| 2019/0248618 A1 * | 8/2019 | Arthur | ................... | B65H 54/00 |

FOREIGN PATENT DOCUMENTS

| | | | | |
|---|---|---|---|---|
| JP | 2001246028 A | * | 9/2001 | |
| JP | 2003070944 A | * | 3/2003 | ............. A63B 53/10 |

\* cited by examiner

PROCESS FOR MANUFACTURING A BI-MATERIAL SHAFT

CROSS REFERENCES TO RELATED APPLICATIONS

The Present Application is a continuation application of U.S. patent application Ser. No. 16/672,184, filed on Nov. 1, 2019, which claims priority to U.S. Provisional Patent Application No. 62/755,668, filed on Nov. 5, 2018, and is a continuation-in-part application of U.S. patent application Ser. No. 16/368,346, filed on Mar. 28, 2019, now U.S. patent Ser. No. 10/486,036, issued on Nov. 26, 2019, which claims priority to U.S. Provisional Patent Application No. 62/654,052, filed on Apr. 6, 2018, each of which is hereby incorporated by reference in its entirety

STATEMENT REGARDING FEDERALLY SPONSORED RESEARCH OR DEVELOPMENT

Not Applicable

BACKGROUND OF THE INVENTION

Field of the Invention

The present invention relates to a process for manufacturing a bi-material shaft.

Description of the Related Art

The prior art discloses various multiple material shafts.

An ideal golf club shaft should be of a minimal weight while concurrently being of a sufficient durability and stiffness to effectively allow all of the kinetic energy developed by the golfer to be transmitted to the golf ball. Heretofore, steel, or other metal, or non-graphite golf club shafts have been produced that are 95 grams or greater at traditional lengths of 40 and 41 inches or on average 2.38 and 2.32 grams/inch, respectively. In the prior art weight range, the average golfer cannot generate enough club head speed to produce much shaft flexing during the swing.

BRIEF SUMMARY OF THE INVENTION

The present invention is a process for manufacturing a bi-material shaft.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
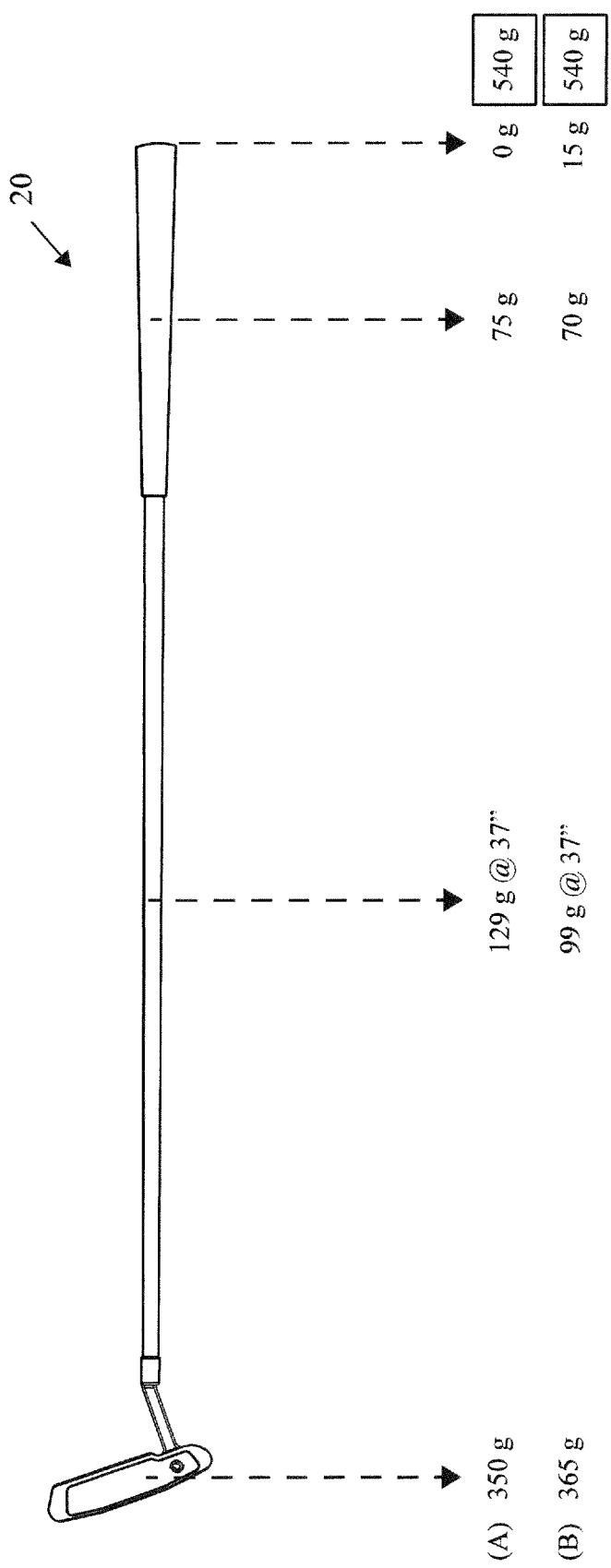
FIG. 1 is an illustration of a putter and a comparison of a prior art putter and a putter of the present invention.
Figure 2:
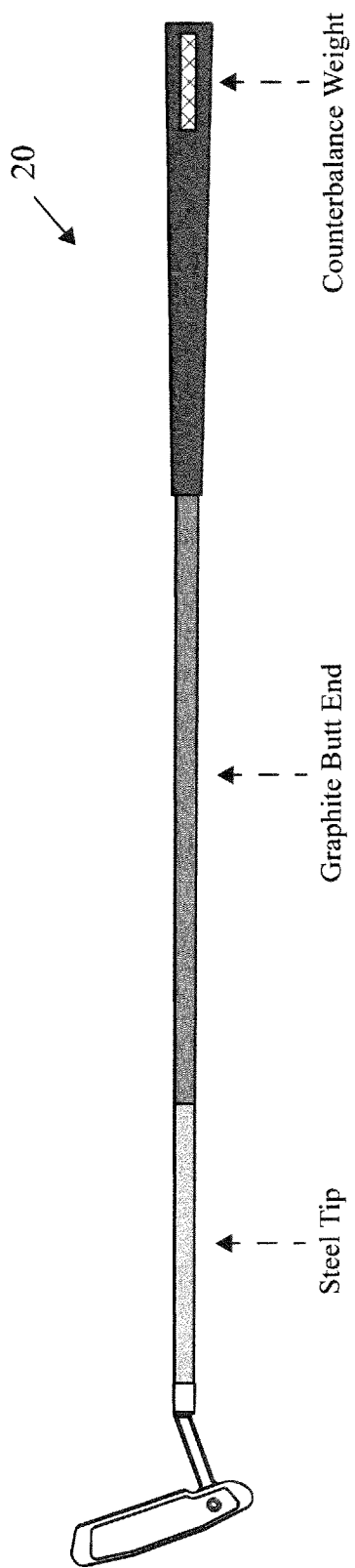
FIG. 2 is an illustration of a putter.
Figure 3:
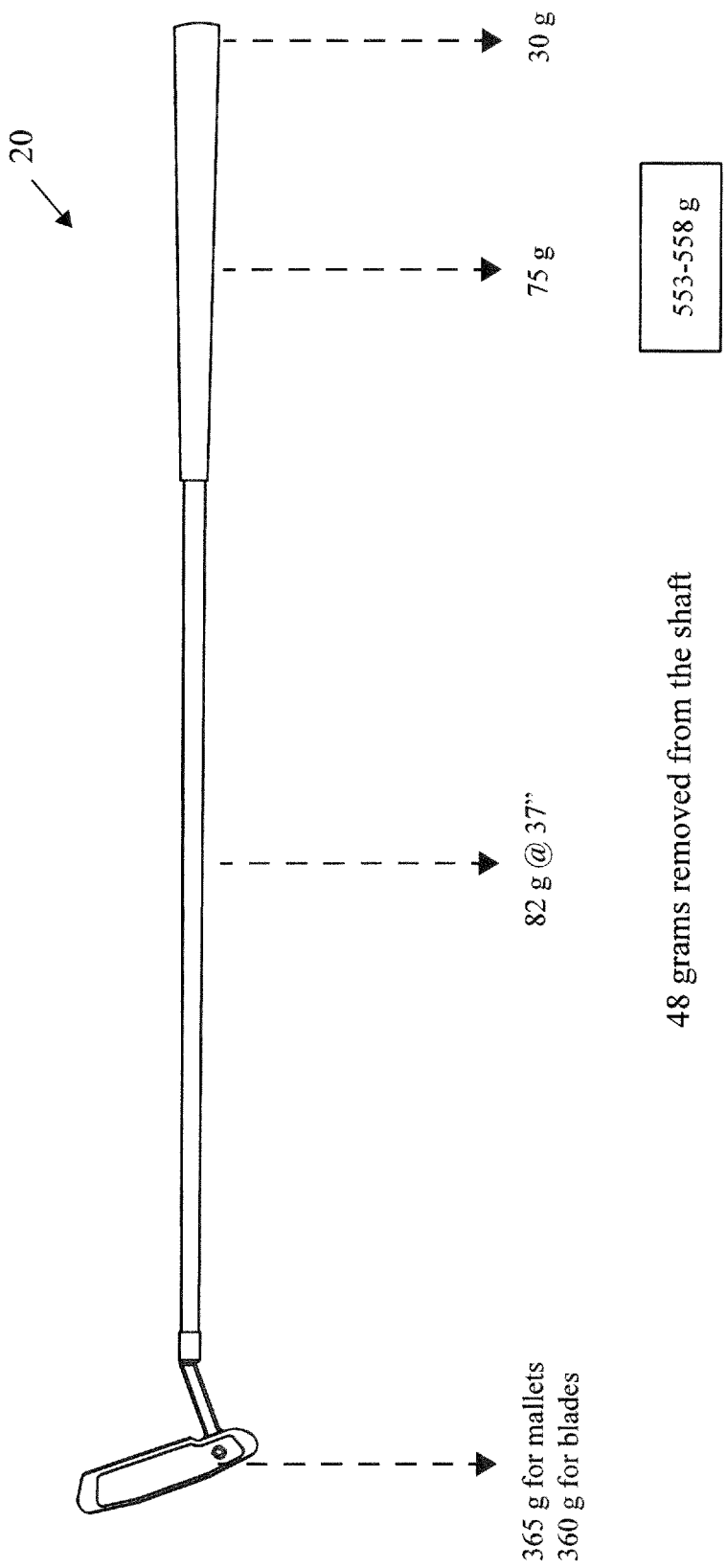
FIG. 3 is an illustration of a putter.
Figure 4:
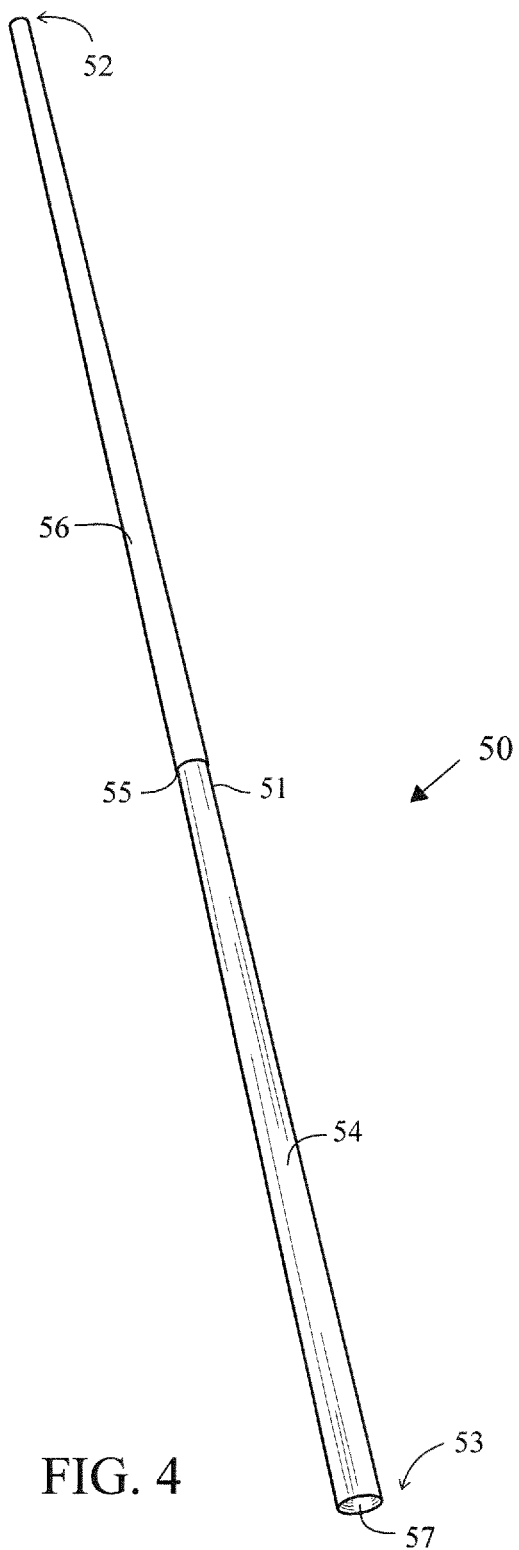
FIG. 4 is an image of a bi-material shaft.
Figure 5:
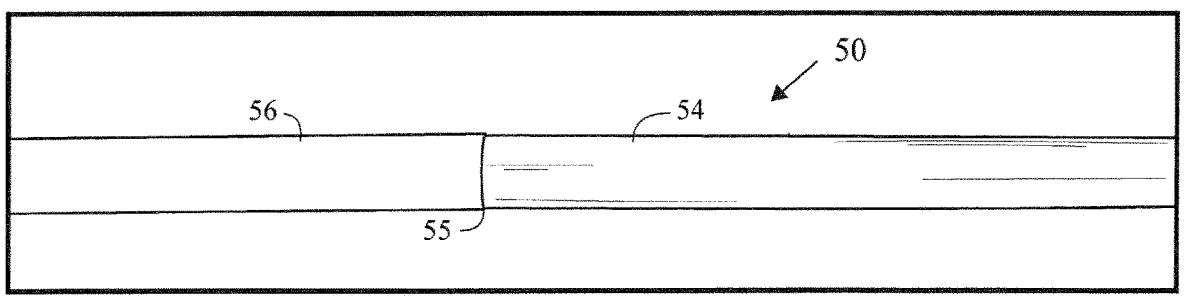
FIG. 5 is an image of an intersection of a bi-material shaft.
Figure 6:
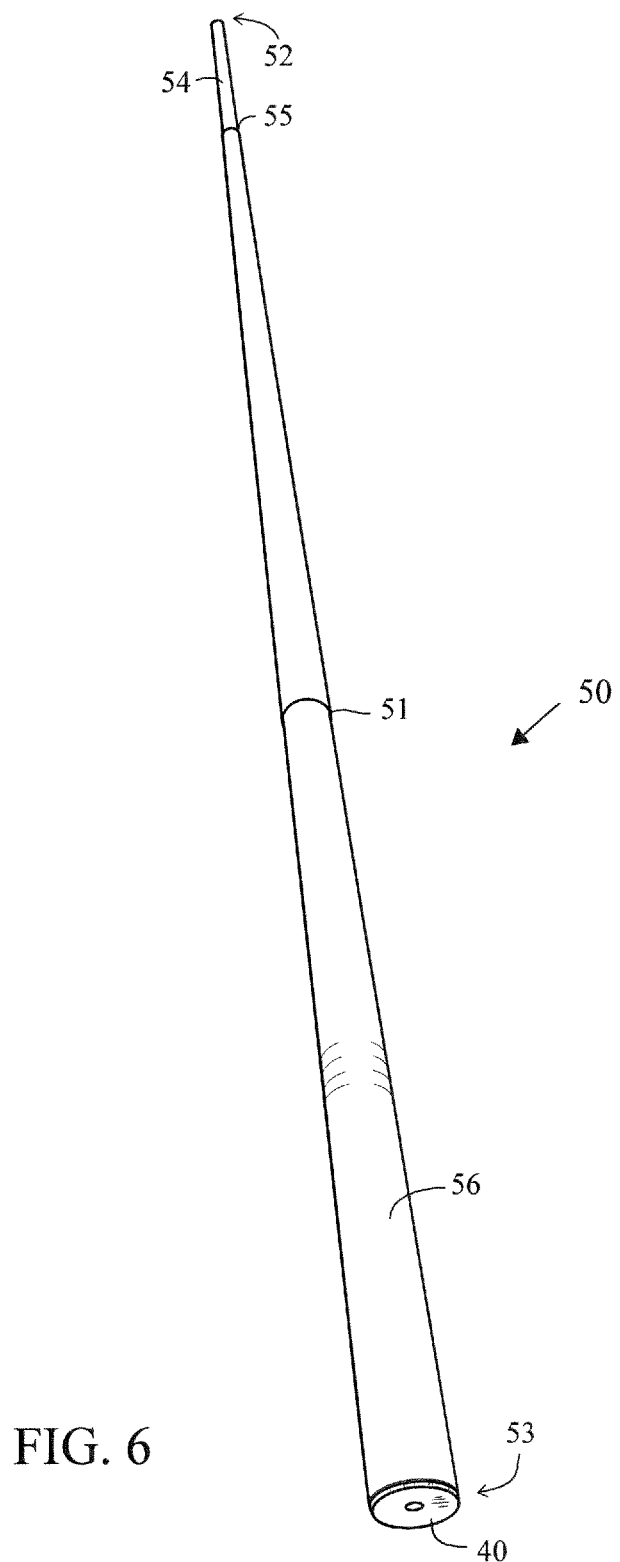
FIG. 6 is an image of a butt end of a bi-material shaft.
Figure 7:
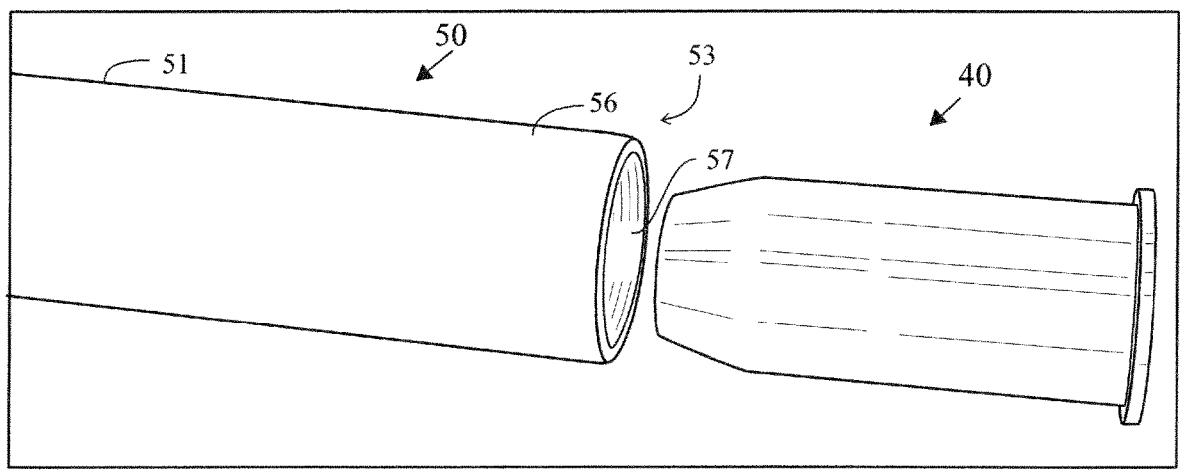
FIG. 7 is an exploded view image of a butt end of bi-material shaft with a mass member.
Figure 8:
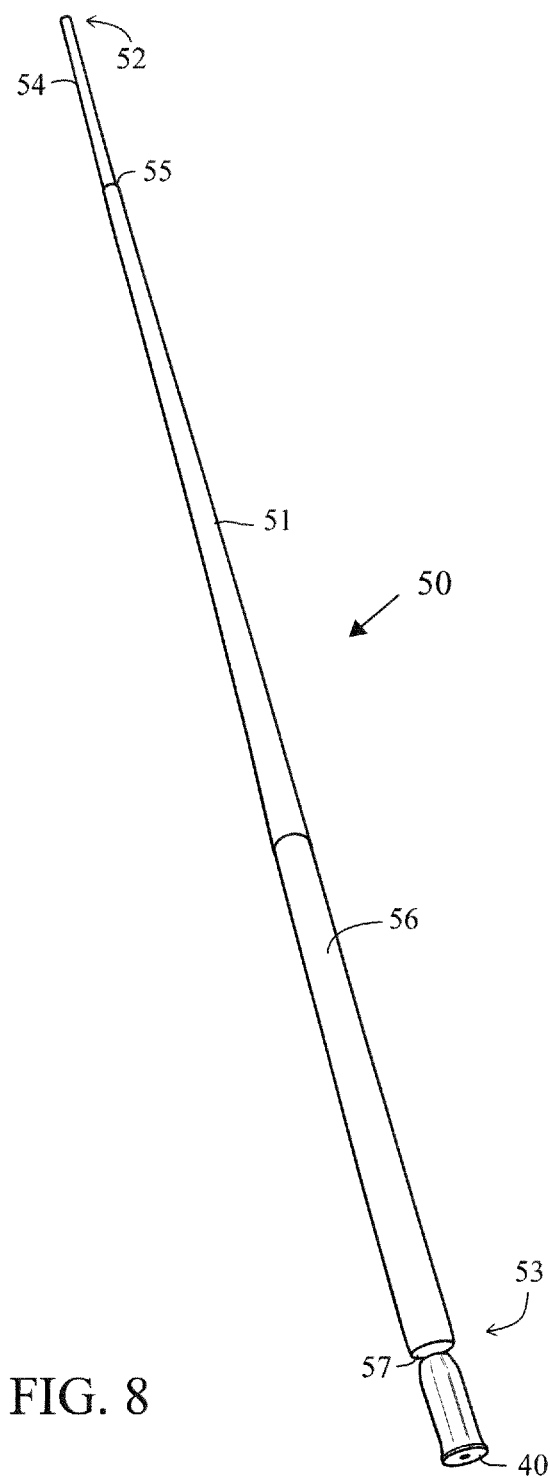
FIG. 8 is an exploded view image of a bi-material shaft with a mass member.
Figure 9:
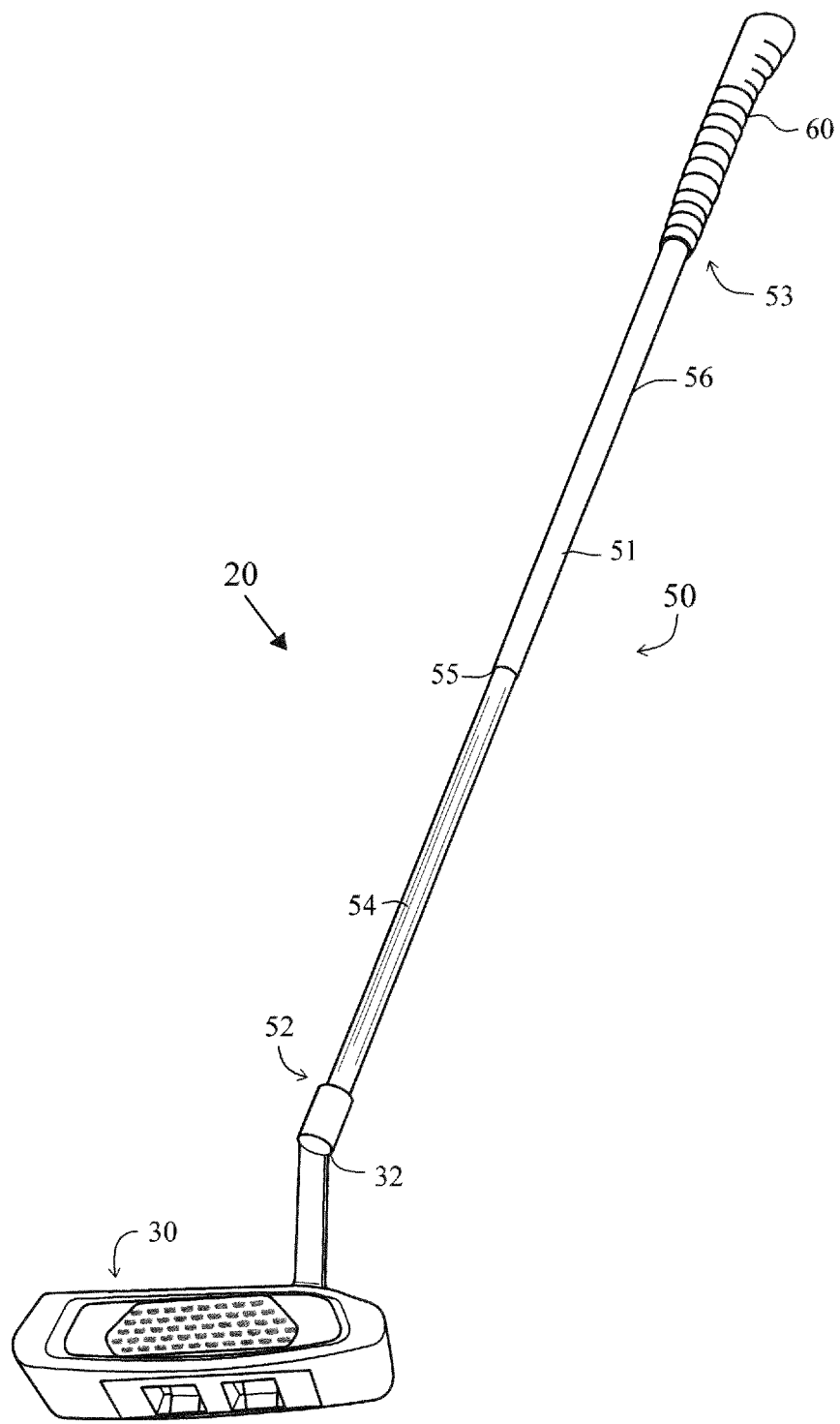
FIG. 9 is an image of a putter with a bi-material shaft.
Figure 10:
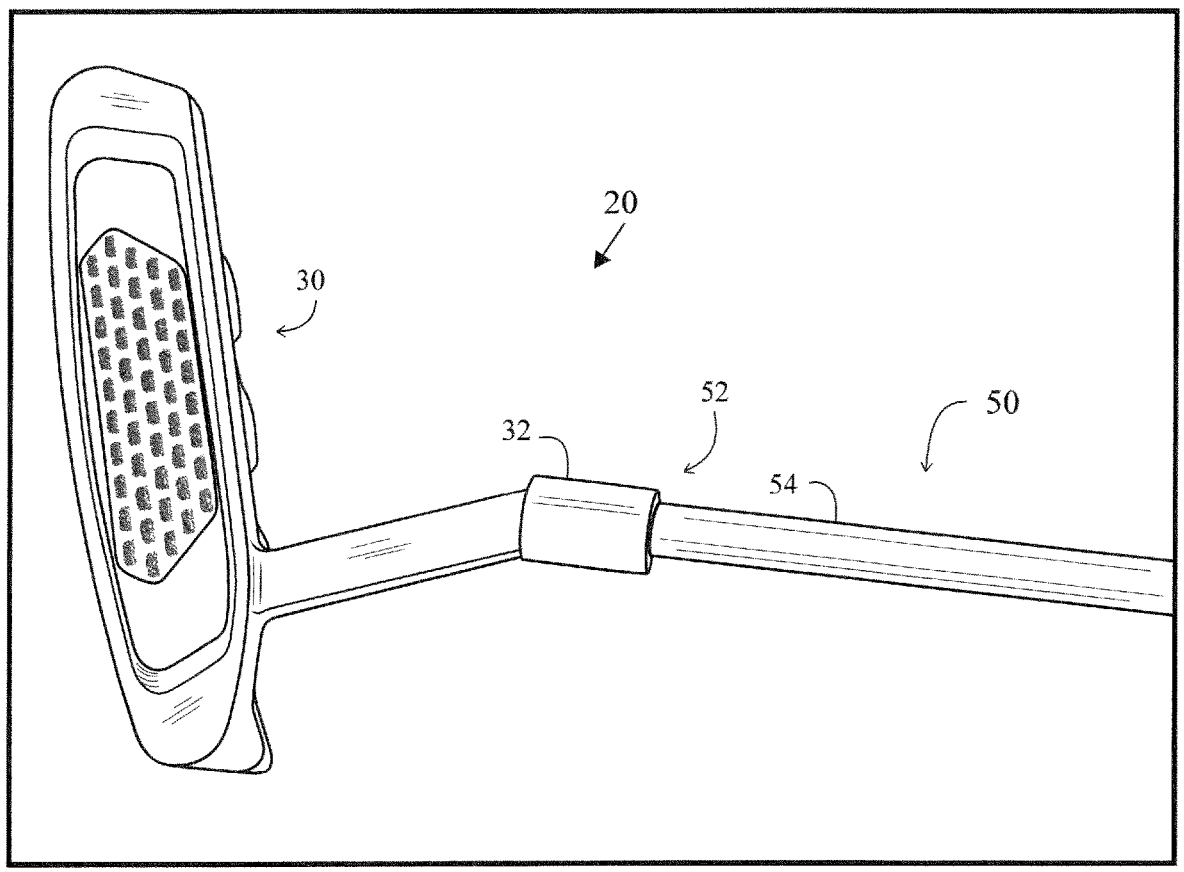
FIG. 10 is an image of a putter with a bi-material shaft.
Figure 11:
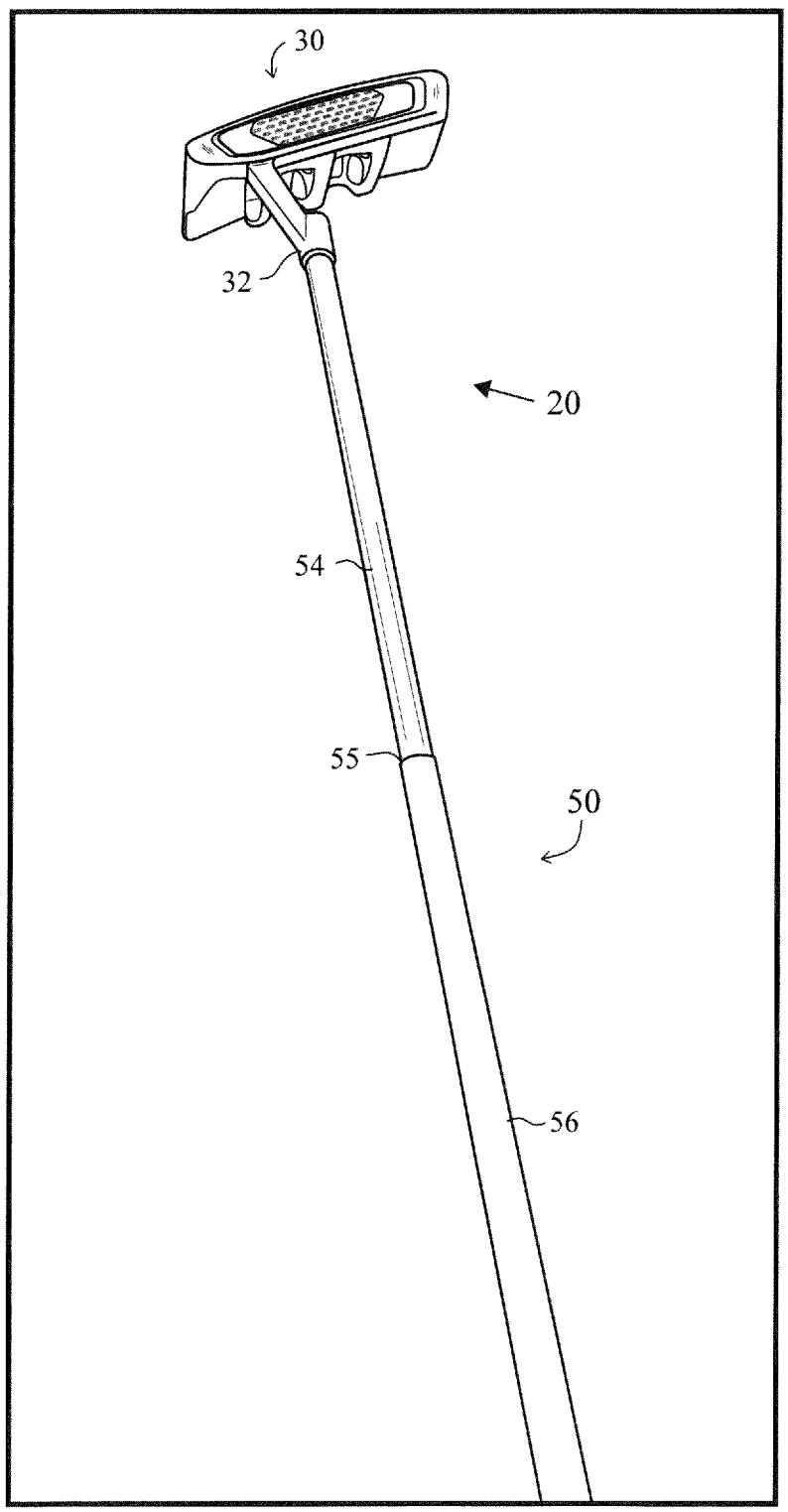
FIG. 11 is an image of a putter with a bi-material shaft.
Figure 12:
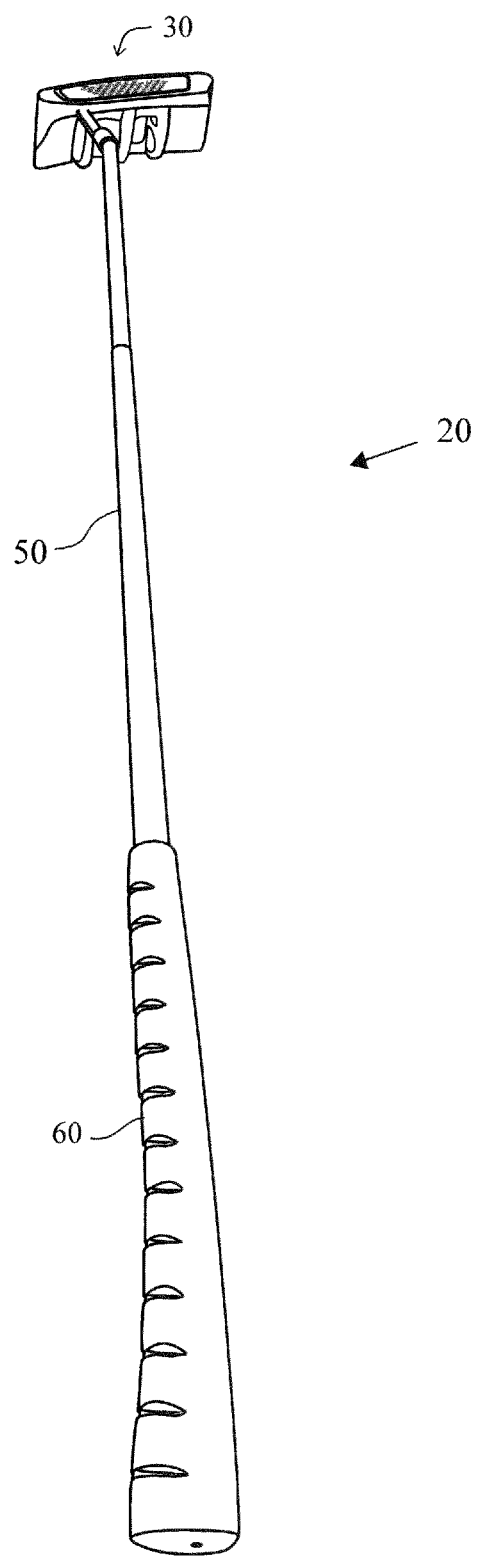
FIG. 12 is an image of a putter with a bi-material shaft.

FIGS. 1-3 is a comparison of a putter with a standard shaft and a putter with a bi-material shaft. As shown in FIG. 4-12, a bi-material shaft 50 for a putter 20 allows for mass optimization to increase a moment of inertia of the putter 20. FIGS. 4 and 5 illustrate an embodiment with a metal section 54 at the butt end 53 and a composite section 56 at a tip end 52 of a body 51 of a shaft 50. FIGS. 5-12 illustrate an embodiment with a metal section 54 at the tip end 52 and a composite section 56 at the butt end 53 of a body 51 of a shaft 50.

The putter 20 comprises a putter-head 30, a mass member 40, a shaft 50 and a grip 60. The putter-head 30 comprises a hosel 32. The shaft 50 comprises a body 51 with a tip end 52 and a butt end 53. The body 51 comprises a metal section 54 extending from the tip end 52 to a connection point 55, and a composite section 56 extending from the butt end 53 to the connection point 55. The mass member 40 is positioned within an opening 57 at the butt end 53 of the shaft 50. Mass that otherwise would be present in the shaft 50 is transferred to the putter-head 30 and the mass member 40 in the butt end 51 of the shaft 50.

The metal section 54 of the bi-material shaft 50 is manufactured from metal such as steel, titanium, aluminum, or alloys thereof. A preferred metal is 4140m alloy steel available from manufacturers such as Worthington Steel of Pennsylvania.

An outer diameter of the butt end 53 of the shaft 50 ranges generally from about 0.550 to about 0.625 inch, desirably from about 0.560 to about 0.615 inch, and preferably from about 0.600 to about 0.610 inch. Alternatively, the butt end 53 is tapered, and has a reduction in outer diameter of less than about 0.010 inch per linear inch of the butt section, along the longitudinal axis of the shaft. The length of the butt section generally ranges from about 4 to about 16 inches, and preferably from about 8 to about 14 inches depending on the shaft stiffness desired.

The outer diameter of a tapered tip end 51 decreases from a location where it connects to the tapered end to a distal end thereof which reduces the outer diameter of the tip end in a range generally from about 0.001 to about 0.020 inch per linear inch of the tip end, desirably from about 0.0050 to about 0.0100 inch per linear inch of the tip section, and preferably is about 0.0075 inch per linear inch of the tip section.

The mass member 40 preferably has a mass ranging from 20 grams to 40 grams, and most preferably 30 grams.

The composite section is preferably from 60 to 80 percent of the length of the shaft and the composite section is preferably less than 50 percent of the mass of the shaft, and most preferably less than 25 percent of the mass of the shaft.

The grip 60 preferably has a mass ranging from 40 grams to 65 grams.

The putter-head 30 preferably has a mass ranging from 300 to 400 grams.

Figure 13:
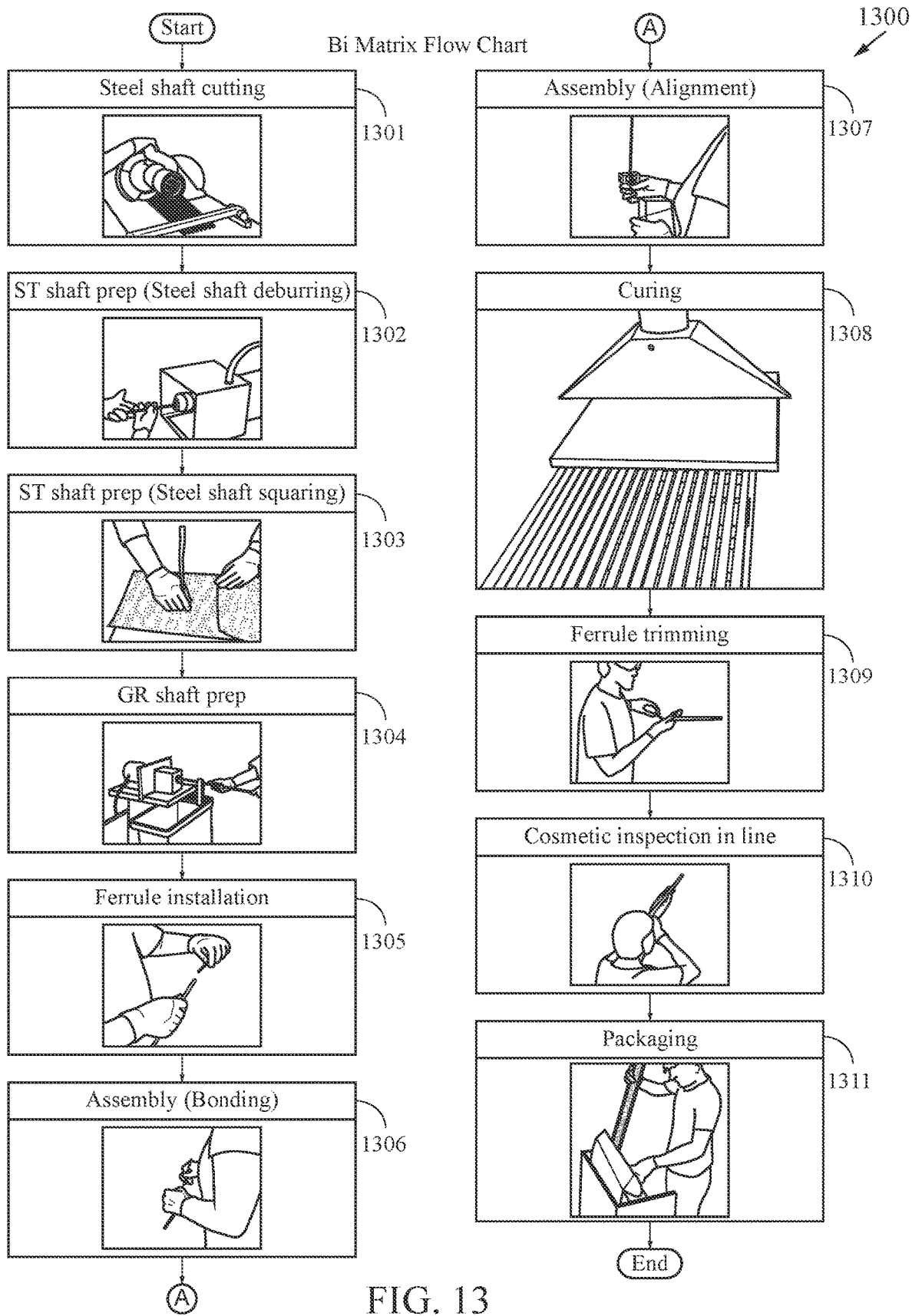
FIG. 13 is a block diagram of a process for manufacturing a bi-material shaft.

FIG. 13 is a block diagram of a process 1300 for manufacturing a bi-material shaft illustrating steps 1301-1311.

Figure 14:
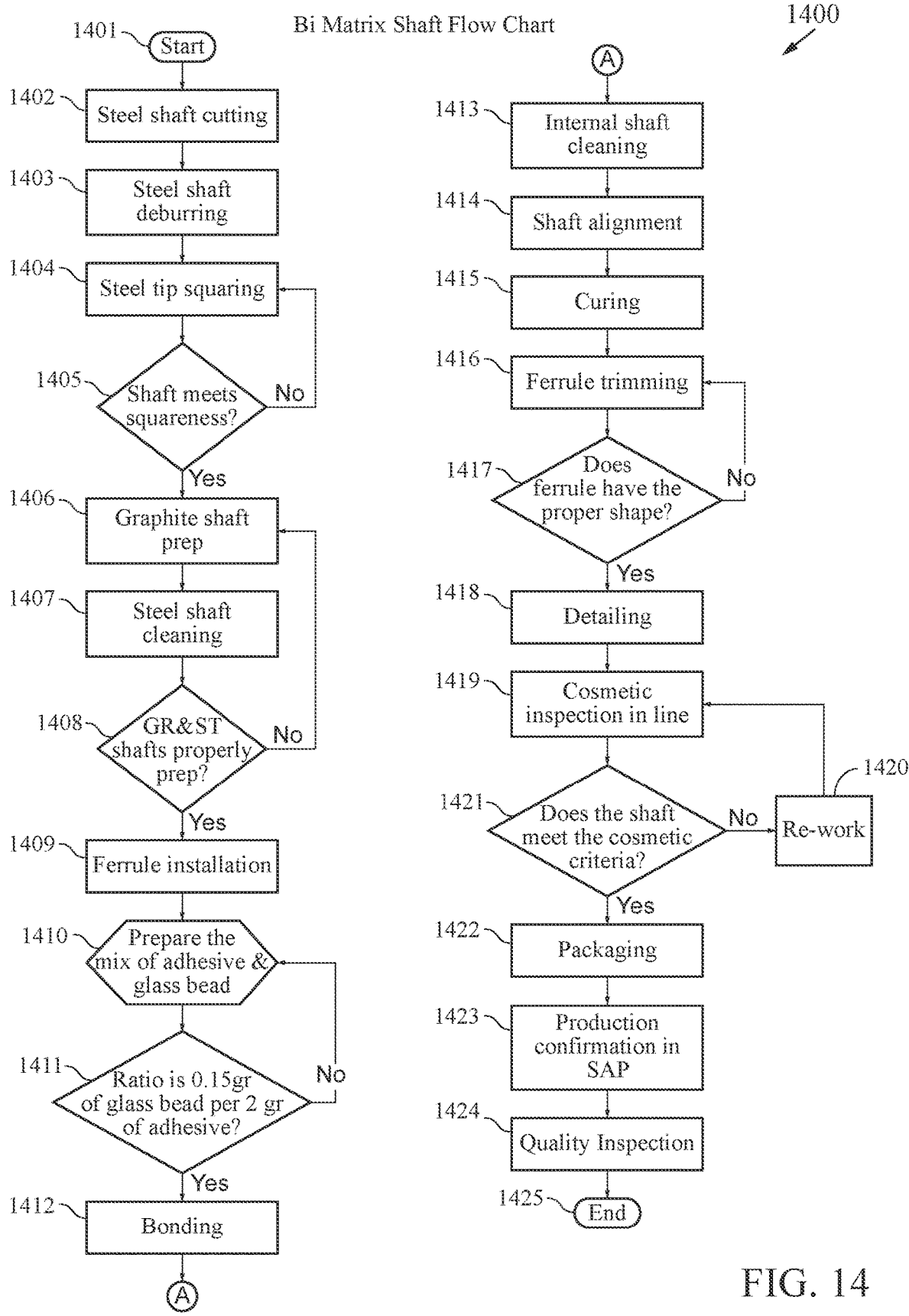
FIG. 14 is a flow chart of a process for manufacturing a bi-material shaft.

FIG. 14 is a flow chart of a process 1400 for manufacturing a bi-material shaft illustrating steps 1401-1425.

The steel shaft cutting is performed by a rotary saw blade cutting disc which cuts the steel shaft to length.

The steel shaft deburring is performed by a tip sander deburring tool which eliminates burrs. An insert cut section of tip of the steel shaft is direct at the deburring tool until the burrs are removed.

The steel tip squaring is performed using 320μ sand paper. Squaring of the steel tip includes rotation of shaft on the sand paper to ensure squareness of cut section.

The graphite shaft prep includes a tip sander with a chuck to prep the graphite shaft for bonding. First, one removes the graphite shaft from the plastic bag. Next, one grinds the graphite shaft in the tip master. Next, one cleans the exterior of graphite section by wiping it with a club wipe.

The steel shaft is cleaned.

Ferrule installation Adhesive dispenser/que tip stick Adhesive Applying adhesive for the Trim ring. Twist the graphite tip shaft versus steel shaft. Apply adhesive to lower end of bonding area, on graphite. Push trim ring onto graphite shaft with the steel tip.

Bonding Adhesive and Glass beads mixing: Dispense adhesive in a cup. Place cup on to scale and dispense glass bead into bonding agent and mix thoroughly. 0.15 grams of glass bead for 2 grams of adhesive.

Adhesive applied to graphite and steel: Use little que tip stick to apply the adhesive w/beads evenly to the butt area of interior steel shaft by swab procedure; Apply the adhesive w/beads evenly to the bonding area of the Graphite shaft by rolling procedure.

Assemble graphite to steel Join steel and graphite pieces after adhesive application, pressing firmly together.

Place shaft properly into alignment station, push down on graphite section and lock into place with pneumatic cylinders. Align graphic to laser.

Place shaft carefully in curing equipment. Push the curing equipment in to curing blower.

Cure in blower for 10-15 min with a temperature of 225 F.

Clean up the excessive adhesive with acetone then use plastic/blade tool to wipe the ring area.

No adhesive residual on the shaft and ring area. Reducing ferrule to same height as the rest of shaft. Step of the ring and shaft is ≤0.2 mm.

U.S. Pat. No. 9,808,679 for a Golf Club Shaft Connection Assembly is hereby incorporated by reference in its entirety.

U.S. Pat. No. 9,694,262 for a Putter With Adjustable Hosel is hereby incorporated by reference in its entirety.

U.S. Pat. No. 9,216,334 for a Variable Length Golf Club Shaft is hereby incorporated by reference in its entirety.

U.S. Pat. No. 9,155,947 for an Adjustable Golf Club Shaft And Hosel Assembly is hereby incorporated by reference in its entirety.

U.S. Pat. No. 9,017,507 for a Method And System For Manufacturing A Composite Shaft is hereby incorporated by reference in its entirety.

U.S. Pat. No. 6,692,377 for a Graphite Shaft With Foil Modified Torsion is hereby incorporated by reference in its entirety.

U.S. Pat. No. 6,413,232 for a Method For Manufacturing Hybrid Golf Club Shafts is hereby incorporated by reference in its entirety.

U.S. Pat. No. 4,591,157 for a Golf Club Shaft is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for manufacturing a bi-material shaft for a golf club, the method comprising:
   preparing a mix of adhesive and glass beads wherein a ratio of glass beads to adhesive is 0.15 gram of glass beads to 2 grams of adhesive;
   bonding a cleaned cut steel shaft to a prepared graphite shaft with the mix of adhesive and glass beads to form an uncured bi-material shaft;
   curing the uncured bi-material shaft to form a cured bi-material shaft;
   trimming a ferrule of the cured bi-material shaft; and
   finishing the cured bi-material shaft.

2. The method according to claim 1 further comprising aligning the uncured bi-material shaft.

3. The method according to claim 1 wherein the cured bi-material shaft comprises a graphite section which is from 60 to 80 percent of the length of the cured bi-material shaft and the graphite section is less than 50 percent of a mass of the cured bi-material shaft.

4. The method according to claim 1 wherein the cured bi-material shaft comprises a graphite section which is from 60 to 80 percent of the length of the cured bi-material shaft and the graphite section is less than 25 percent of a mass of the cured bi-material shaft.

5. The method according to claim 1 wherein curing the uncured bi-material shaft to form a cured bi-material shaft comprises curing in a blower for 10 to 15 minutes at a temperature ranging from 200 to 250 degrees Fahrenheit.

\* \* \* \* \*